Oct. 30, 1962
A. N. BRUNSON
3,060,792
OPTICAL ALIGNMENT INSTRUMENT
Filed May 16, 1960
3 Sheets-Sheet 1
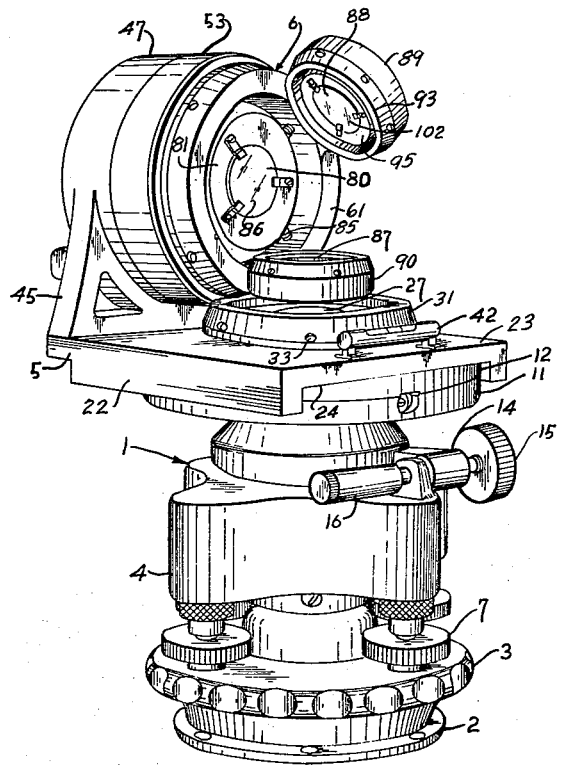
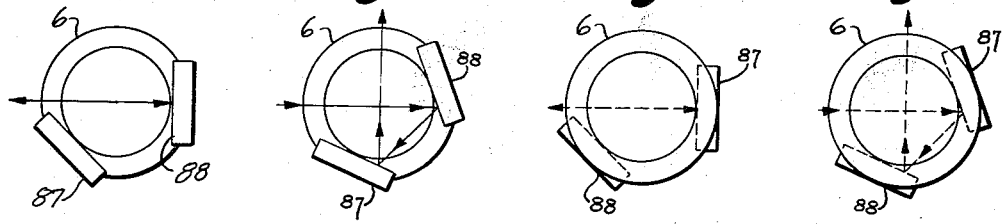
INVENTOR.
Amber N. Brunson.
BY
Fishburn and Gold
ATTORNEYS.

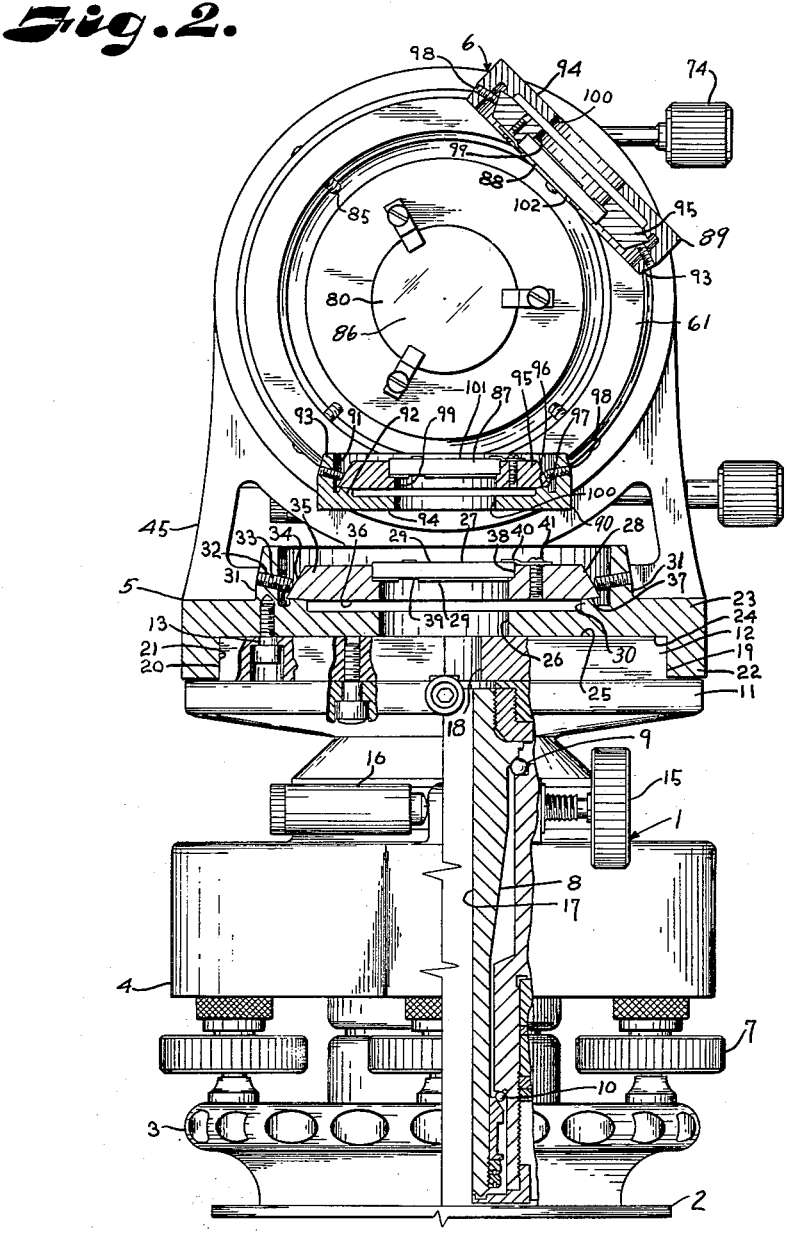

Oct. 30, 1962 A. N. BRUNSON 3,060,792
OPTICAL ALIGNMENT INSTRUMENT
Filed May 16, 1960 3 Sheets-Sheet 3
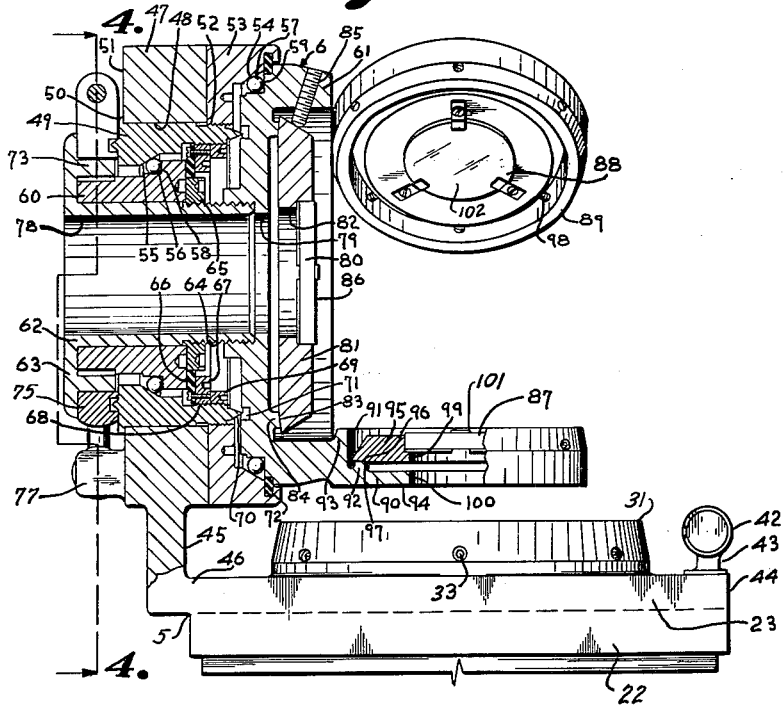
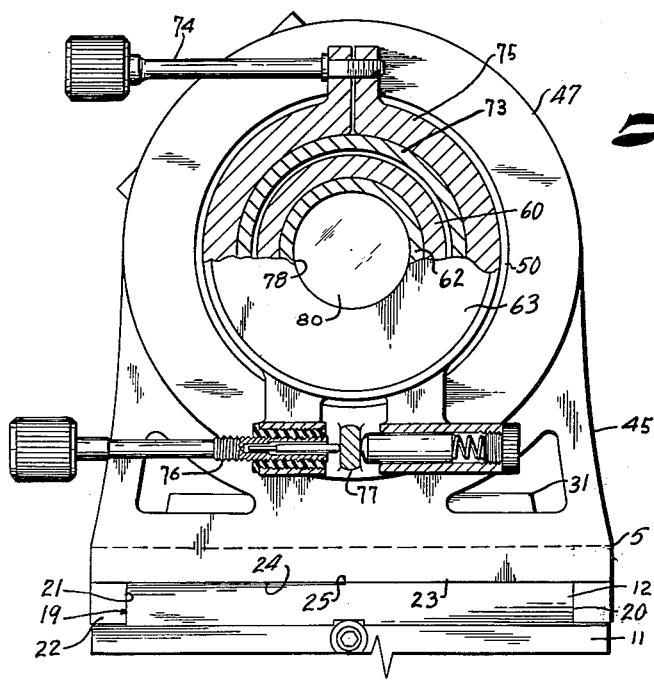
INVENTOR.
Amber N. Brunson.
BY Fishburn and Gold
ATTORNEYS.

United States Patent Office 3,060,792
Patented Oct. 30, 1962

3,060,792
OPTICAL ALIGNMENT INSTRUMENT
Amber N. Brunson, Kansas City, Mo., assignor to Brunson Instrument Company, Kansas City, Mo., a corporation of Missouri
Filed May 16, 1960, Ser. No. 29,399
11 Claims. (Cl. 88—14)

This invention relates to optical instruments, and more particularly to an optical alignment instrument for use in what is termed optical tooling for locating points in planes perpendicular to optical lines of sight and points in the lines perpendicular to an optical line of sight.

This invention contemplates an optical instrument for use with line scopes, collimators and the like for establishing reference lines of sight to locate planes and lines in making necessary measurements and establishing points in the setting up, positioning and alignment of parts of complex structures such as airplanes, large machines, missiles and the like, whereby critical points or positions can be located with precision.

The principal objects of the present invention are to provide an optical instrument by means of which it is possible to locate a line perpendicular to an optical line of sight and to locate an optical line of sight perpendicular to the plane defined by said line of sight and the line perpendicular thereto; to provide an optical instrument with optical flat mirrors and/or semi-transparent mirrors in angular relation and movable on axes for precise determination of lines and planes perpendicular to reference lines by auto-reflection and/or auto-collimation; to provide such an instrument with a pair of mirrors having plane reflecting surfaces facing each other at an angle of 45 degrees and perpendicular to a plane normal to the axis of rotation of said mirrors with the mirrors carried on a hollow axle having a semi-transparent mirror mounted thereon with a plane reflecting surface perpendicular to the axis of rotation; to provide such an instrument in which said mirrors are carried on a standard rotatable about a second axis perpendicular to the first rotatable axis whereby lines and planes perpendicular to lines of sight may be accurately located; to provide such an instrument with a base and leveling head rotatably mounting a spindle which adjustably carries the standard on which the mirror carrying member is rotatably mounted; to provide such an instrument with a vertical spindle carried in the base and having through axial sighting opening with a semi-transparent mirror having a plane reflecting surface perpendicular to said vertical axis; to provide such an instrument wherein a pair of mirrors form penta-reflectors mounted for rotation on two perpendicular axes to make it possible to locate a point exactly in line with one of said axis; and to provide an optical instrument for use in optical tooling and the like that can be quickly and easily adjusted for accurate alignment and positioning, checked and utilized for consistency in close and extreme accuracy in the locating of planes, lines and points for more precision as well as speed in the construction and setting up of complex structures.

Other objects and advantages of this invention will become apparent from the following description taken in connection with the accompanying drawings, wherein are set forth by way of illustration and example certain embodiments of this invention.

FIG. 1 is a perspective view of an optical instrument embodying the features of the present invention.

FIG. 2 is an enlarged elevational view of the optical instrument with portions broken away to illustrate the structure thereof.

FIG. 3 is an enlarged partial elevational view partly in section to illustrate the rotatable mounting of the mirror carrier.

FIG. 4 is a vertical sectional view through the instrument on the line 4—4, FIG. 3.

FIG. 5 is a diagrammatic illustration of a pair of mirrors arranged for return reflection along a line of sight.

FIG. 6 is a similar diagrammatic view with a pair of reflectors rotated on their horizontal axis to reflect a beam from the line of sight along a line at 90 degrees from the line of sight.

FIG. 7 is a similar diagrammatic view showing the pair of reflectors with their mounting rotated through 180 degrees from the positions of FIGS. 5 and 6, with the other mirror of the pair reflecting back along the line of sight.

FIG. 8 is a diagrammatic view similar to FIG. 7 with the pair of mirrors rotated whereby the beam along the line of sight is reflected along a line at 90 degrees from the line of sight.

Referring more in detail to the drawings:

The numeral 1 designates an optical instrument or optical square which generally consists of a base member 2, a foot plate 3, leveling head 4, and a standard 5 on which is rotatably mounted a mirror carrier 6 which mounts a plurality of mirrors, as later described.

The base member 2 is adapted to be mounted on a suitable support such as stands, tool bars (not shown) or other supporting structure to position the instrument relative to reference lines or optical lines of sight. The foot plate 3 is suitably secured to the base member 2 and the leveling head 4 is mounted over the foot plate 3, for example, with a half ball construction so it can be tilted in all directions over the foot plate 3. Leveling screws 7 are provided between the foot plate and the leveling head for adjusting the leveling head 4 to make the vertical axis of the instrument truly vertical.

The standard 5 is mounted for rotation about the vertical axis with respect to the leveling head 4 by means of a spindle 8 rotatably mounted in bearings 9 and 10 with a lower plate 11 suitably secured to the upper end of the spindle and an intermediate plate 12 adjustably mounted on the lower plate for lateral movement relative thereto, the standard being secured to the intermediate plate by suitable fastening devices such as screws 13. A clamp and fine adjustment means 14 are provided between the lower plate structure and the leveling head 4, the clamp and fine adjustment means being in the form of a clamp screw 15 and a tangent screw 16. The structure of the foot plate 3, leveling head 4, adjusting screws 7, clamp and fine adjustment means 14, spindle 8, bottom plate 11 and intermediate plate 12 are all substantially of the same construction and operation as the corresponding parts disclosed in the Brunson Patent No. 2,849,911 issued September 2, 1958, with the exception that the spindle 8 has a through axial bore or sight opening 17 which aligns with an axial bore 18 extending vertically through the intermediate plate 12 to provide for sighting therethrough and for directing a light beam therethrough along the spindle axis of the instrument for alignment as later described. The intermediate plate 12 carrying the standard 5 is arranged for lateral movement relative to the bottom plate 11 for movement of the intermediate plate and the standard transversely of the spindle axis in the same manner and for the same purpose as illustrated and described in said Brunson Patent No. 2,849,911.

In the illustrated structure, the bottom plate 11 is circular in form and the intermediate plate 12 is also circular except that it has parallel ways 19 engaged by the standard. The plate 12, as shown, is cut away on opposite sides to form oppositely disposed parallel flat faces 20 adapted to be engaged by inner faces 21 of depending side flanges 22 of a standard base plate 23 which has a bottom face 24 engaging an upper surface 25 of the intermediate plate 12. The standard base plate 23 is arranged in perpendicular relation to the spindle axis and has a through axial bore 26 aligned with the opening 18 in the intermediate plate 12 and the bore 17 through the spindle 8.

An optically flat, partially coated or semi-transparent mirror 27 is suitably mounted on the standard base plate in line with the opening 26, and said mirror is adjustably carried by mounting structure 28 whereby the surfaces 29 of the optical flat mirror are perpendicular to the axis of the spindle 8. The partially coated or semi-transparent mirror is an optically flat window coated to provide some reflection of light and some passage of light therethrough. The coating may be as desired to provide the proportion of reflected light desired. In the illustrated structure, the mounting structure 28 includes upstanding concentric rib or flange portions 30 and 31 on the standard base plate 23 with the rib portion 31 having a plurality of threaded apertures 32 spaced circumferentially therearound and inclined toward the plate 23 whereby adjusting screws 33 threaded in the threaded apertures 31 have their inner ends engaged with bevelled surfaces 34 of a mirror carrying plate 35 provided with a bottom face 36 which is accurately machined with a spherical contour of relatively large radius that conforms to the outer spherical surface 37 of the rib member 30. The arrangement of the screws 33 holds the plate 35 whereby the spherical contours are engaged and an adjustment of the screws 33 will vary the position of the plate 35 whereby the optical flat mirror 27 carried by the plate 35 may be adjusted to accurately position the surfaces of said mirror perpendicular to the axis of the spindle 8. The mirror carrying plate 35 has a counterbore 38 arranged to provide spaced lugs 39 and the optical flat mirror 27 has the marginal portions of the inner face 29 thereof engaged with the lugs 39 and are held in such engagement by clips 40 which are secured by suitable fastening devices such as screws 41 to the plate 35 whereby the optically flat, semi-transparent mirror 27 is perpendicular to and in a line of sight from above or below parallel to the axis of the spindle 8.

To aid in leveling the instrument and thereby arrange the spindle 8 whereby the axis thereof is vertical, a level vial 42 is suitably positioned on the standard 5. In the illustrated structure, the level vial 42 is carried by supports 43 at one end 44 of the standard base plate 23 whereby said level vial may be readily viewed from above.

The standard 5 includes an upright portion or leg 45 extending at a right angle or upwardly from the other end 46 of the plate 23, said upright portion having a bearing mounting member 47 thereon for supporting the mirror carrier 6. The mounting member 47 has a bore 48 with an axis perpendicular to the spindle axis for receiving a sleeve 49. The sleeve 49 has an annular flange 50 engaging the outer face 51 or face of the mounting member 47 remote from the spindle axis, and said sleeve 49 extends through the bore 48 and has external threads 52 on which are threaded a nut 53 which is tightened whereby the mounting member 47 is clamped between the flange 50 and the nut 53 to retain the sleeve 49 and nut 53 against rotation relative to the mounting member 47. The sleeve 49 and nut 53 have tapered bores 54 and 55 forming outer races for engaging ball bearings 56 and 57 respectively supported in annular grooves 58 and 59 of an inner race 60 and ring member 61 respectively which are parts of the mirror carrier 6. The inner race 60 is sleeved on a tubular member 62 having an annular flange or end portion 63 engaging one end of said inner race 60. Th other end of the tubular member extends through the sleeve and has an externally threaded portion 64 on which is threaded the ring member 61 to provide the relative positioning of the grooves 58 and 59 relative to the inclined bores 54 and 55 for suitable engagement with the ball bearings 56 and 57. A collar 65 is threaded on the tubular member 62 between the ring member 61 and the inner race 60 to clamp said inner race between the collar 65 and the flange or end portion 63. A seal member 66 sealingly engages the collar 65 and the adjacent end of the inner race 60, said seal member being carried by an externally threaded ring 67 threaded into an internally threaded portion 68 of the sleeve 49, a nut 69 being threaded behind the ring member 67 to lock same in place. The sleeve member 49 also has a rib portion 70 engaged in a groove 71 in the ring member 61 to form a dust seal, as illustrated in FIG. 3. A resilient seal member 72 is mounted in the nut 53 and engages the ring member 61 outwardly of the bearing 57 to further provide a seal to keep out dust or other extraneous matter from the bearing.

The end portion 63 of the tubular member 62 has a cylindrical portion 73 arranged to cooperate with a clamp and fine adjustment means between the mirror carrying member 6 and the standard 5. In the embodiment shown, these take the form of a clamp screw 74 to clamp or loosen a clamping ring 75 on the cylindrical portion 73, and a tangent screw 76 carried on the clamp ring 75 and acting against a lug 77 on the standard 5, as illustrated in FIG. 4.

The tubular member 62 has a through bore or sight opening 78 which substantially registers with an axial bore 79 in the ring member 61. An optical flat partially coated or semi-transparent mirror 80 is mounted in a mirror carrying plate 81 having an axial aperture 82 registering with the bore or opening 79, said mirror 80 being held to the plate 81 in the same manner as the securing of the mirror 27 to the plate 35. Also, the plate 81 has a spherical contour 83 engaged with a corresponding contour on an annular rib 84 with the plate 81 adjustably held thereagainst by means of adjusting screws 85 to provide for adjusting of the plate 81 and the mirror 80 thereon in the same manner as the adjustment of the plate 35 and mirror 27 whereby the optically flat surfaces 86 of the semi-transparent mirror 80 may be adjusted to accurately position the surfaces of said mirror perpendicular to the axis of the bore 78 and the rotatable sleeve and ring structure of the mirror carrier 6 mounted in the bearings 56 and 57, which axis of rotation is perpendicular to the axis of the spindle 8 with the bearing mountings of the spindle 8 and the rotatable ring member or mirror carrier 6 being adjustable to eliminate endplay of said spindle and said rotatable mirror carrier, thereby maintaining extreme accuracy.

Optically flat mirrors 87 and 88 are arranged and supported for rotation about an axis that is perpendicular to the axis of the spindle 8 with the two mirrors on opposite sides of their axis of rotation and facing each other at an angle of 45 degrees, said mirrors 87 and 88 being positioned whereby they can be rotated and selectively positioned with their centers in line with the axis of the spindle 8 and their optically flat faces perpendicular to the axis of the spindle 8, the mirrors 87 and 88 being capable of serving as a penta-reflector whereby a light beam perpendicular to the axis of rotation of the rotatable member or mirror carrier 6 and the spindle 8 and intersecting at their point of intersections may be reflected by the mirrors 87 and 88 along a line exactly in line with the axis of the spindle 8. In the structure illustrated, the mirrors 87 and 88 are adjustably supported in arms 89 and 90 respectively on the ring member 61 of the mirror carrier 6 and extending therefrom beyond the axis of the spindle 8. The arms 89 and 90 are preferably fixed relative to the ring member 61 with equal radial spacing from the axis of rotation of the rotatable mirror carrier 6 and extending substantially perpendicularly to the faces of the mirror 80. The arms 89 and 90 have their facing portions recessed as at 91 to form a circular rib 92 and an annular flange 93 extending inwardly from a rear wall 94 in each of said arms, as illustrated in FIG. 2. The mirrors 87 and 88 are each supported in plates 95 having a spherical surface 96 engaging a spherical surface 97 on the respective ribs 92 and are adjustably held in place by fastening devices such as screws 98 arranged in the respective flange 93 whereby the respective mirror mountings for the mirrors 87 and 88 are substantially the same and adjustable in the same manner as described relative to the mirror mounting of the mirror 27. The plates 95 each have openings 99 registering with openings 100 in the respective rear walls 94 and, while said mirrors 87 and 88 may be full mirrors, it is preferred that they be partial or semi-transparent mirrors whereby the opening 100 serves as a sight opening for the respective mirror. The arms 89 and 90 are arranged and the mirrors 87 and 88 adjustable therein whereby said mirrors 87 and 88 face each other with the planes of the respective faces 101 and 102 thereof at a 45 degree angle or, in other words, center axial lines of the respective mirrors perpendicular to the faces thereof are at an angle of 135 degrees and intersect at a point which is also a point of intersection of said lines with the axis of rotation of the mirror carrier 6 which is also the point of intersection of the axis of the spindle 8. The axial center lines from the mirrors 87 and 88 defining a plane which extends through the spindle axis and is parallel to the optically flat faces of the mirror 80, as illustrated in FIGS. 2 and 3.

The instrument may, for example, be used with one or more auto-collimators which establish reference lines of sight. The instrument is set up so that a beam of light from a collimator (not shown) strikes the mirror 80 so that the reflected image lines up with the reticle of the auto-collimator, and with the mirror properly adjusted the axis of the mirror carrier 6 will lie parallel to the auto-collimator line of sight. Then, by rotating the standard on the spindle through 180 degrees, the reflected image should again line up with the reticle of the auto-collimator. By rotating the mirror carrier 6 to position one of the reflectors 87 and 88 substantially in a plane parallel with a plane defined by the axes of the mounting member 6 and the spindle 8, and then rotating the standard 90 degrees, said mirror, for example, mirror 88, may be positioned whereby the beam from the auto-collimator will strike said mirror 88 and the same reflected image will line up with the reticle of the auto-collimator, and by again rotating the standard through another 180 degrees the same image will be reflected back from the mirror 88 to line up with the reticle of the auto-collimator. This procedure can also be followed with the other of the pair of mirrors as, for example, mirror 87. By using two auto-collimators arranged to establish two beams of light, one perpendicular to the other, and in a plane substantially perpendicular to the axis of the spindle 8 and intersecting on a point on said line of the axis of the spindle 8, and with the instrument positioned whereby the image from one auto-collimator strikes the mirror 80 and is reflected back to line up with the reticle of the respective auto-collimator, and the mirror, for example, mirror 88, positioned to have the beam of light from the second auto-collimator strike the face of said mirror 88 whereby the reflected image lines up with the reticle of the second auto-collimator, then by rotation of the standard through 90 degrees, the image from the beam of the first auto-collimator will be reflected back by the mirror 88 and the beam from the second auto-collimator will be reflected back from the mirror 80, and the images should line up with the respective reticles of the auto-collimators. By further rotation of the standard 90 degrees to position same 180 degrees from the original position, the beam of light from the first auto-collimator will again strike the mirror 80 from the opposite side thereof and the beam of light from the second auto-collimator will strike the mirror 88 from the opposite side thereof, and the images of the respective beams will be reflected back to line up with the reticles of the respective auto-collimators, thereby proving the accuracy of the position of the spindle 8 with the axis perpendicular to the plane defined by the beams from the auto-collimators, the perpendicularity of the planes of the mirror 80 and the mirror 88 or the perpendicularity of the beams from the auto-collimators. The same procedure can be followed using the mirror 80 and the mirror 87. Then by rotating the standard to again position the mirror 80 whereby the beam from the first auto-collimator strikes same and is reflected back to line up the image with the reticle of said auto-collimator and by rotating the mirror carrier 6 to the position illustrated in FIG. 5 relative to the beam of light from the second auto-collimator wherein the image is reflected back to align with the reticle of the second auto-collimator, and then rotating the mirror carrier 6 to position the mirrors 87 and 88, as illustrated in FIG. 6, the beam of light or line of sight from the second auto-collimator will be reflected from the mirror 88 to the mirror 87 and then upwardly on a line coinciding with the axis of the spindle 8 whereby the beam or line of sight from the second auto-collimator can be used to establish a point exactly in line with the axis of the spindle 8. By rotating the standard through 180 degrees, and the mirror carrier 6 to position the mirror 87 to reflect the beam from the second auto-collimator back to line up with the reticle of said auto-collimator, as illustrated in FIG. 7, and then rotating the mirror carrier 6 to position the mirrors as illustrated in FIG. 8, the beam from the second auto-collimator will be reflected from the mirror 87 to the mirror 88 and then on a line coinciding with the axis of the spindle 8, thereby providing a check of the accuracy of the point established when the instrument was positioned with the mirrors as illustrated in FIG. 6. The instrument can also be used wherein the beam from an auto-collimator is directed through the bore 78 to strike the mirror 80 to establish a line of sight with the flat surfaces of the mirror 80 perpendicular to said line of sight, and then the mirrors 87 and 88 used to establish points in planes parallel to the surfaces of the mirror 80 and thereby in a plane perpendicular to the line of sight of the auto-collimator, and each point so established can be checked as to accuracy by reversing the instrument as, for example, rotating the standard through 180 degrees and rotating the mirror carrier 6 to properly position the mirrors 87 and 88. Due to the hollow spindle 8, an auto-collimator may be positioned as, for example, below the instrument and directed whereby the beam therefrom will be directed through the hollow spindle or bore thereof to strike the mirror 27 and be reflected back whereby the image will line up with the reticle of the respective auto-collimator, and then the mounting member may be rotated to position either of the mirrors 87 and 88 in parallel relation to the mirror 27 whereby the image therefrom will also be reflected back to line up with the reticle of the auto-collimator, and then the mirror carrier 6 rotated to move the mirrors 87 and 88 whereby the beam from said auto-collimator directed through the bore of the spindle will be partially transmitted through the mirror 27 and then reflect from one of the mirrors 87 and 88 to the other one, and be reflected to establish a point in a line perpendicular to the axis of the spindle, which line would also be perpendicular to the axis of the mirror carrier 6, said points being on a horizontal line when the spindle 8 is positioned on a vertical line and, by rotating the standard, various points could be established to fix a plane perpendicular to the spindle 8. By use of a plurality of such instruments, a plurality of spaced parallel planes may be precisely located, as well as various points in said parallel planes, and each of the points or lines established may be checked as to accuracy and the instrument itself checked as to accuracy by reversing positions of the mirrors relative to lines of sight or reference line through rotation of the standard and mirror carrier 6, thereby providing an optical instrument having a wide variety of uses in optical tooling for locating lines, points and planes with extreme accuracy.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. An instrument for locating points in a line perpendicular to an optical line of sight comprising, a ring member, a standard, means on the standard supporting said ring member for rotation about its axis, a pair of mirrors each having a plaine reflecting surface and mounted on said ring member on opposite sides of the axis of rotation thereof and equally spaced therefrom so that said reflecting surfaces face each other at an angle of 45 degrees and extend from said ring member perpendicular to a plane normal to said axis of rotation, and a third mirror having a plane reflecting surface mounted on said ring member so that the plane of the reflecting surface is perpendicular to the axis of rotation of said ring member and thereby perpendicular to the planes of the reflecting surfaces of said pair of mirrors, the perpendicularity of the plane reflecting surface of said third mirror being determinable by observing through another optical instrument having fixed location an image reflected on a line of sight thereof from said plane reflecting surface of said third mirror, said pair of mirrors being positioned in a line of sight whereby an image is reflected from one to the other and then on a line 90 degrees from said line of sight.

2. An instrument for locating points in a line perpendicular to an optical line of sight comprising, a mirror carrier, bearings supporting said mirror carrier for rotation about its axis, a pair of mirrors each having a plane reflecting surface and mounted on said mirror carrier on opposite sides of the axis of rotation thereof and equally spaced therefrom so that said reflecting surfaces face each other at an angle of 45 degrees and extend from said mirror carrier perpendicular to a plane normal to said axis of rotation, a standard supporting said bearings, means rotatably mounting said standard for rotation about a vertical axis perpendicular to the axis of said mirror carrier, and a third mirror having a plane reflecting surface mounted on said mirror carrier so that the plane of the reflecting surface is perpendicular to the axis of rotation of said mirror carrier and thereby perpendicular to the planes of the reflecting surfaces of said pair of mirrors, the perpendicularity of the plane reflecting surface of said third mirror being determinable by observing through another optical instrument having fixed location an image reflected on a line of sight thereof from said plane reflecting surface of said third mirror then rotating the standard 90 degrees and the mirror carrier until said image is reflected back to said another optical instrument by one of said pair of mirrors and then rotating said mirror carrier to a position where the image is reflected by said pair of mirrors on a line perpendicular to said line of sight and then rotating said standard 180 degrees and said mirror carrier until said image is reflected back from the other of said pair of mirrors and then rotating said mirror carrier until the image is reflected by said pair of mirrors along said line perpendicular to said line of sight.

3. An instrument for locating points in a line perpendicular to an optical line of sight comprising, a ring member, bearings supporting said ring member for rotation about its axis, a pair of mirrors each having a plane reflecting surface and mounted on said ring member on opposite sides of the axis of rotation thereof and equally spaced therefrom so that said reflecting surfaces face each other at an angle of 45 degrees and extend from said ring member perpendicular to a plane normal to said axis of rotation, a standard supporting said bearings, means rotatably mounting said standard for rotation about a vertical axis perpendicular to the axis of said ring member, a semi-transparent mirror having a plane reflecting surface mounted on said ring member so that the plane of the reflecting surface is perpendicular to the axis of rotation of said ring member and thereby perpendicular to the planes of the reflecting surfaces of said pair of mirrors, the perpendicularity of the plane reflecting surface of said semi-transparent mirror being determinable by observing through another optical instrument having fixed location an image reflected on a line of sight thereof from said plane reflecting surface of said semi-transparent mirror then rotating the standard 90 degrees and the ring member until said image is reflected back to said another optical instrument by one of said pair of mirrors and then rotating said ring member to a position where the image is reflected by said pair of mirrors on a line perpendicular to said line of sight and then turning the standard another 90 degrees whereby the image is reflected from the opposite side of said semi-transparent mirror to said another optical instrument and then rotating said standard another 90 degrees and said ring member until said image is reflected back from the other of said pair of mirrors and then rotating said ring member until the image is reflected by said pair of mirrors along said line perpendicular to said line of sight.

4. An instrument for locating points in a line perpendicular to an optical line of sight comprising, a ring member, a standard, means on the standard supporting said ring member for rotation about its axis, a pair of mirrors each having a plane reflecting surface and mounted on said ring member on opposite sides of the axis of rotation thereof and equally spaced therefrom so that said reflecting surfaces face each other at an angle of 45 degrees and extend from said ring member perpendicular to a plane normal to said axis of rotation, means rotatably mounting said standard for rotation about a vertical axis perpendicular to the axis of said ring member, a semi-transparent mirror having a plane reflecting surface mounted on said ring member so that the plane of the reflecting surface is perpendicular to the axis of rotation of said ring member and thereby perpendicular to the planes of the reflecting surfaces of said pairs of mirrors, said ring member and standard having a sight opening axially of said ring member whereby said semi-transparent mirror reflecting surfaces perpendicular to the axis of rotation of the ring member may be viewed along said axis from opposite sides of said mirror, and clamping means on the standard and operative for retaining the ring member in selected rotative position.

5. An instrument for locating points in a line perpendicular to an optical line of sight comprising, a ring member, bearings supporting said ring member for rotation about its axis, a pair of mirrors each having a plane reflecting surface and mounted on said ring member on opposite sides of the axis of rotation thereof and equally spaced therefrom so that said reflecting surfaces face each other at an angle of 45 degrees and extend from said ring member perpendicular to a plane normal to said axis of rotation, a standard supporting said bearings, means rotatably mounting said standard for rotation about a vertical axis perpendicular to the axis of said ring member, a semi-transparent mirror having a plane reflecting surface mounted on said ring member so that the plane of the reflecting surface is perpendicular to the axis of rotation of said ring member and thereby perpendicular to the planes of the reflecting surfaces of said pairs of mirrors, said ring member and standard having a sight opening axially of said ring member whereby said semi-transparent mirror reflecting surfaces perpendicular to the axis of rotation of the ring member may be viewed along said axis from opposite sides of said mirror, clamping means on the standard and operative for retaining the ring member in selected rotative position, and clamping means for retaining said standard in selective rotative position.

6. An instrument for locating points in a line perpendicular to an optical line of sight comprising, a mirror carrier, bearings supporting said mirror carrier for rotation about its axis, a pair of semi-transparent mirrors each having a plane reflecting surface and mounted on said mirror carrier on opposite sides of the axis of rotation thereof and equally spaced therefrom so that said reflecting surfaces face each other at an angle of 45 degrees and extend from said mirror carrier perpendicular to a plane normal to said axis of rotation, a standard supporting said bearings, means rotatably mounting said standard for rotation about a vertical axis perpendicular to the axis of said mirror carrier, a third semi-transparent mirror having a plane reflecting surface mounted on said mirror carrier so that the plane of the reflecting surface is perpendicular to the axis of rotation of said mirror carrier and thereby perpendicular to the planes of the reflecting surfaces of said pairs of mirrors, said mirror carrier and standard having a slight opening axially of said mirror carrier whereby said third semi-transparent mirror reflecting surfaces perpendicular to the axis of rotation of the mirror carrier may be viewed along said axis from opposite sides of said mirror, and clamping means on the standard and operative for retaining the mirror carrier in selected rotative position, and clamping means for retaining said standard in selective rotative position.

7. An optical instrument comprising, a base, a leveling head on the base, a spindle rotatably mounted in said base, a standard carried by said spindle for rotation on the axis thereof, said standard having an upstanding portion spaced laterally from the axis of said spindle, a carrier, means rotatably mounting said carrier on the upstanding portion of the standard for rotation on an axis perpendicular to the axis of the spindle, a pair of mirrors having plane reflecting surfaces mounted on the carrier so that said reflecting surfaces of said pair of mirrors are facing each other at an angle of 45 degrees and equally spaced from and on opposite sides of the axis of rotation of the carrier, said reflecting surfaces of said pair of mirrors each being in planes perpendicular to a plane normal to the axis of rotation of the carrier, said carrier and said pair of mirrors being positioned with the pair of mirrors extending over said spindle and movable whereby lines normal to the mirrors of said pair at centers thereof lie in a single plane at all rotative positions of the carrier relative to the standard, said carrier and upstanding portion of the standard having a through sight opening axially of the carrier, a semi-transparent mirror having a plane reflecting surface mounted on the carrier so that the plane of the reflecting surface is perpendicular to the axis of rotation of the carrier and thereby perpendicular to the planes of each of said pair of mirrors.

8. An optical instrument comprising, a base, a leveling head on the base, a spindle rotatably mounted in said base, a standard carried by said spindle for rotation on the axis thereof, said standard having an upstanding portion spaced laterally from the axis of said spindle, a carrier, means rotatably mounting said carrier on the upstanding portion of the standard for rotation on an axis perpendicular to the axis of the spindle, a pair of mirrors having plane reflecting surfaces mounted on the carrier so that said reflecting surfaces of said pair of mirrors are facing each other at an angle of 45 degrees and equally spaced from and on opposite sides of the axis of rotation of the carrier, said reflecting surfaces of said pair of mirrors each being in planes perpendicular to a plane normal to the axis of rotation of the carrier, said carrier and said pair of mirrors being positioned with the pair of mirrors extending over said spindle and movable whereby lines normal to the mirrors of said pair at centers thereof and the axis of the spindle lie in a single plane at all rotative positions of the carrier relative to the standard, said carrier and upstanding portion of the standard having a through sight opening axially of the carrier, a semi-transparent mirror having a plane reflecting surface mounted on the carrier so that the plane of the reflecting surface is perpendicular to the axis of rotation of the carrier and thereby perpendicular to the planes of each of said pair of mirrors, clamping means on the leveling head and operative to retain the spindle in selected rotative position, and clamping means on the standard and operative to retain the carrier in selected rotative position.

9. An optical instrument comprising, a base, a leveling head on the base, a spindle rotatably mounted in the base, a standard carried by said spindle for rotation on the axis thereof, a semi-transparent mirror having a plane reflecting surface mounted on the standard so that the plane of the reflecting surface is perpendicular to the axis of said spindle, said spindle and standard having aligned sight openings extending therethrough axially of the spindle whereby an image reflected from said reflecting surface may be observed through another optical instrument aligned with said sight openings, said standard having an upstanding portion spaced laterally from the axis of said spindle, a carrier, means rotatably mounting said carrier on the upstanding portion of the standard for rotation on an axis perpendicular to the axis of the spindle, and a pair of mirrors having plane reflecting surfaces mounted on the carrier so that said reflecting surfaces of said pair of mirrors are facing each other at an angle of 45 degrees and equally spaced from and on opposite sides of the axis of rotation of the carrier, said reflecting surfaces of said pair of mirrors each being in planes perpendicular to a plane normal to the axis of rotation of the carrier, said carrier and said pair of mirrors being positioned with the pair of mirrors extending over said spindle and movable whereby lines normal to the mirrors of said pairs at centers thereof lie in a single plane at all rotative positions of the carrier relative to the standard whereby an image of a point reflected from one of said pair of mirrors to the other may be observed through another optical instrument on a line perpendicular to a line from said point to said one mirror of the pair.

10. An optical instrument comprising, a base, a leveling head on the base, a spindle rotatably mounted in the base, a standard carried by said spindle for rotation on the axis thereof, a semi-transparent mirror having a plane reflecting surface mounted on the standard so that the plane of the reflecting surface is perpendicular to the axis of said spindle, said spindle and standard having aligned sight openings extending therethrough axially of the spindle whereby an image reflected from said reflecting surface may be observed through another optical instrument aligned with said sight openings, said standard having an upstanding portion spaced laterally from the axis of said spindle, a carrier, means rotatably mounting said carrier on the upstanding portion of the standard for rotation on an axis perpendicular to the axis of the spindle, a pair of mirrors having plane reflecting surfaces mounted on the carrier so that said reflecting surfaces of said pair of mirrors are facing each other at an angle of 45 degrees and equally spaced from and on opposite sides of the axis of rotation of the carrier, said reflecting surfaces of said pair of mirrors each being in planes perpendicular to a plane normal to the axis of rotation of the carrier, said carrier and said pair of mirrors being positioned with the pair of mirrors extending over said spindle and movable whereby lines normal to the mirrors of said pair at centers thereof lie in a single plane at all rotative positions of the carrier relative to the standard whereby an image of a point reflected from one of said pair of mirrors to the other may be observed through another optical instrument on a line perpendicular to a line from said point to said one mirror of the pair, said carrier and upstanding portion of the standard having a through sight opening axially of the carrier, and a semi-transparent mirror having a plane reflecting surface mounted on the carrier so that the plane of the reflecting surface is perpendicular to the axis of rotation of the carrier and thereby perpendicular to the planes of each of said pair of mirrors, whereby an image reflected from said semi-transparent mirror reflecting surface on the carrier may be observed through another optical instrument having a fixed location substantially axially of the axis of the carrier.

11. An optical instrument comprising, a base, a leveling head on the base, a spindle rotatably mounted in the base, a standard carried by said spindle for rotation on the axis thereof, a semi-transparent mirror having a plane reflecting surface mounted on the standard so that the plane of the reflecting surface is perpendicular to the axis of said spindle, said spindle and standard having aligned sight openings extending therethrough axially of the spindle whereby an image reflected from said reflecting surface may be observed through another optical instrument aligned with said sight openings, said standard having an upstanding portion spaced laterally from the axis of said spindle, a carrier, means rotatably mounting said carrier on the upstanding portion of the standard for rotation on an axis perpendicular to the axis of the spindle, a pair of mirrors having plane reflecting surfaces mounted on the carrier so that said reflecting surfaces of said pair of mirrors are facing each other at an angle of 45 degrees and equally spaced from and on opposite sides of the axis of rotation of the carrier, said reflecting surfaces of said pair of mirrors each being in planes perpendicular to a plane normal to the axis of rotation of the carrier, said carrier and said pair of mirrors being positioned with the pair of mirrors extending over said spindle and movable whereby lines normal to the mirrors of said pair at centers thereof and the axis of the spindle lie in a single plane at all rotative positions of the carrier relative to the standard whereby an image of a point reflected from one of said pair of mirrors to the other may be observed through another optical instrument on a line perpendicular to a line from said point to said one mirror of the pair, said carrier and upstanding portion of the standard having a through sight opening axially of the carrier, a semi-transparent mirror having a plane reflecting surface mounted on the carrier so that the plane of the reflecting surface is perpendicular to the axis of rotation of the carrier and thereby perpendicular to the planes of each of said pair of mirrors, whereby an image reflected from said semi-transparent mirror reflecting surface on the carrier may be observed through another optical instrument having a fixed location substantially axially of the axis of the carrier, clamping means on the leveling head and operative to retain the spindle in selected rotative position, and clamping means on the standard and operative to retain the carrier in selected rotative position.

References Cited in the file of this patent

UNITED STATES PATENTS

| | | |
|---|---|---|
| 2,570,275 | Reading | Oct. 9, 1951 |
| 2,849,911 | Brunson | Sept. 2, 1958 |
| 2,937,560 | Modes et al. | May 24, 1960 |